United States Patent

Guttman et al.

(10) Patent No.: US 8,027,907 B2
(45) Date of Patent: Sep. 27, 2011

(54) FIXED-INCOME SYSTEM FOR MANAGING PRE-TRADE ACTIVITY

(75) Inventors: Edward Guttman, New York, NY (US); Mark Pollack, New York, NY (US); Jim Perrello, Madison, NJ (US); Jawaid Hakim, Brooklyn, NY (US); Robert Hector, New Brunswick, NJ (US); Howard Pein, Harrison, NY (US)

(73) Assignee: Codestreet LLC, New York, NY (US)

( * ) Notice: Subject to any disclaimer, the term of this patent is extended or adjusted under 35 U.S.C. 154(b) by 152 days.

(21) Appl. No.: 11/943,543

(22) Filed: Nov. 20, 2007

(65) Prior Publication Data

US 2008/0208732 A1 Aug. 28, 2008

Related U.S. Application Data

(60) Provisional application No. 60/860,241, filed on Nov. 20, 2006.

(51) Int. Cl.
    *G06Q 40/00* (2006.01)
(52) U.S. Cl. .......................................................... 705/37
(58) Field of Classification Search .................... 705/37
    See application file for complete search history.

(56) References Cited

U.S. PATENT DOCUMENTS

| | | | | |
|---|---|---|---|---|
| 7,024,387 B1 * | 4/2006 | Nieboer et al. | ................. | 705/37 |
| 7,769,668 B2 * | 8/2010 | Balabon | ........................ | 705/37 |
| 2003/0004859 A1 * | 1/2003 | Shaw et al. | ..................... | 705/37 |
| 2003/0093343 A1 * | 5/2003 | Huttenlocher et al. | ......... | 705/35 |
| 2003/0233307 A1 * | 12/2003 | Salvadori et al. | ............... | 705/37 |
| 2004/0153389 A1 * | 8/2004 | Lortscher, Jr. | .................. | 705/36 |
| 2004/0172356 A1 | 9/2004 | Agarwal | | |
| 2005/0197857 A1 * | 9/2005 | Avery | ............................. | 705/1 |
| 2005/0234807 A1 * | 10/2005 | Toffey | ............................. | 705/37 |
| 2006/0031157 A1 * | 2/2006 | Gianakouros et al. | ......... | 705/37 |
| 2006/0136326 A1 * | 6/2006 | Heckman et al. | ............... | 705/37 |
| 2006/0173769 A1 * | 8/2006 | Vales | .............................. | 705/37 |
| 2006/0200402 A1 | 9/2006 | Digris et al. | | |
| 2007/0192227 A1 * | 8/2007 | Fitzpatrick et al. | ......... | 705/36 R |
| 2009/0292638 A1 * | 11/2009 | Hausman | ........................ | 705/37 |

OTHER PUBLICATIONS

A-Team Group: CodeStreet TeamWork Targets Sales-Trader Work-Flow Process, http://www.a-teamgroup.com/article/codestreet-teamwork-targets-sales-trader-work-flow-process/#hide, Dec. 1, 2004, p. 1.*
Chapman, P.: An attack on the king, Traders Magazine, Jul. 2004, pp. 1-4.*
PCT Notification of Transmittal of The International Search Report and The Written Opinion of the International Searching Authority, mailed Aug. 29, 2008.

* cited by examiner

*Primary Examiner* — Bijendra K Shrestha
(74) *Attorney, Agent, or Firm* — Thompson Hine LLP

(57) ABSTRACT

Methods and apparatus, including computer program products, for managing pre-trade activity. In general, a distribution of information about what traders and customers want to do may be known. Users may be made aware of trade ideas that can be proposed to a trading desk's buy-side clients. Relevant information on the trading desk may be brought together, and the information may be processed through a set of rules that extract trading opportunities. On the buy side, trade ideas may be extracted without having to have the intervention of a sell-side salesforce.

17 Claims, 9 Drawing Sheets

FIXED-INCOME SYSTEM FOR MANAGING PRE-TRADE ACTIVITY

CROSS REFERENCE TO RELATED APPLICATION

The present patent application claims priority under 35 U.S.C. §119 to U.S. Provisional Patent Application Ser. No. 60/860,241, filed on Nov. 20, 2006, and entitled, "FIXED-INCOME SYSTEM FOR MANAGING PRE-TRADE ACTIVITY," the entire disclosure of which is incorporated by reference herein.

BACKGROUND

This disclosure relates generally to computer-based mechanisms for electronic financial trading, and more particularly to techniques for streamlined pre-trade processes in fixed income securities trading.

In general, the fixed income market is a financial market where participants may buy and sell debt securities usually in the form of bonds. In some markets, trading in the fixed income markets has been largely phone-based but may change, as fixed income transactions may be executed electronically. In the fixed income market, banks and brokers may be on the sell side while asset managers, hedge funds and corporate treasurers may be on the buy side. The sell side may quote tradable bond prices while the buy side may be looking for executable fixed income prices from a wide pool of liquidity providers.

SUMMARY

The subject matter disclosed herein provides methods and apparatus, including computer program products, that implement techniques related to a fixed-income system to manage pre-trade activity.

In general, this document discusses a system and method for enhancing productivity around pre-trade activity on the sell-side fixed income trading desk. In particular, the system may improve a distribution of information about what traders and customers want to do and makes known to users trade ideas that can be proposed to the trading desk's buy-side clients. It may achieve the above goals by bringing together all relevant information on the trading desk, and processing the information through a set of rules that extract the trading opportunities. The system may also be relevant to the buy side as a mechanism to extract trade ideas without having to have the intervention of a sell-side salesforce.

In one general aspect, data characterizing an indication of consummation of a trade of a bond from an emissary of a server application is received. A notification of the consummation to a client application of a client tier is generated. A request to generate an axe being a desire to buy or sell the bond according to a set of criteria is received. Data characterizing a request to publish the axe from the emissary is received. Data characterizing a match to the axe is sent.

The subject matter may be implemented as, for example, computer program products (e.g., as source code or compiled code tangibly embodied in computer-readable media), computer-implemented methods, and systems.

Variations may include one or more of the following features.

The server may cause the axe to be published.

The axe may be prioritized at a level lower than an order to consummate a trade.

Data characterizing an inquiry for a bond matching the criteria may be received from another client application. In response to the inquiry the match may be generated.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
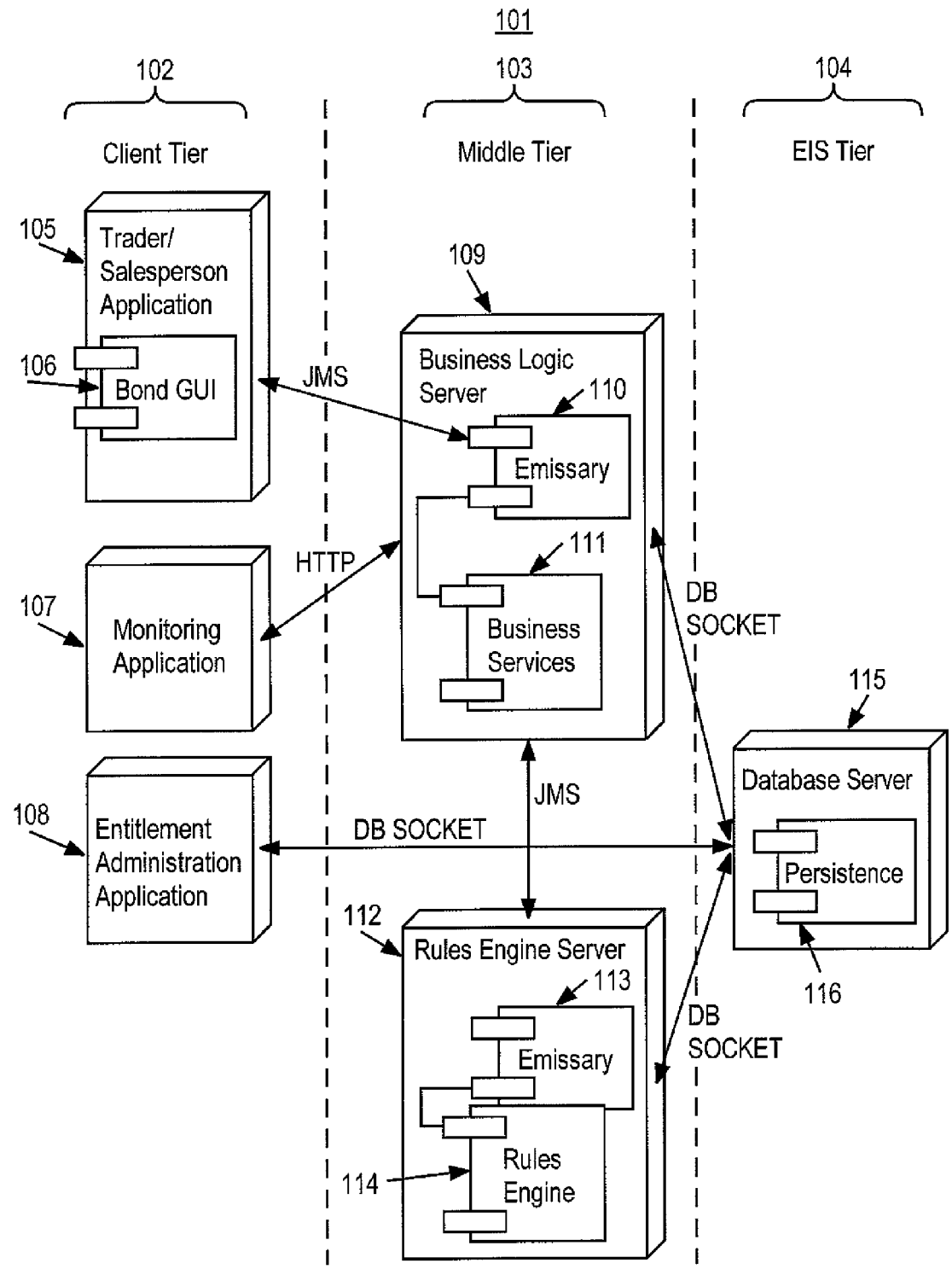
FIG. 1 is a functional block diagram of a bond trading system.

This document describes computer-based systems and processes (hereinafter which may be simply referred to as "the system," which may be an example system that may vary in implementations) that may be configured to streamline the pre-trade processes in the fixed income market. Designed as a singular, integrated application that spans both sales and trading, the system may be configured to provide users (e.g. traders, but which may also include salespersons of a bond trade or buy-side portfolio managers) with one location or interface in which they can manage their workflow. The system may enable a user to manage offerings to salespeople and customers via multiple electronic dealer channels, and enable salespeople to view users' offerings in support of their customers as well as manage incoming customer inquiry, while being able to share this information at their option with traders and other salespeople. Wherever functionality is provided for a salesperson in terms of identifying trading opportunities, similar functionality may be provided for a buy side customer. The system may provide salespeople and traders with one location where they can manage their workflow, and enable salespeople to view traders' offerings in support of their customers as well as manage incoming customer inquiry, sharing this information at their option with traders and other salespeople.

Trading-Side Features

Bond Securities Master Database

The system maintains a securities master database of current dollar-denominated bond issues in a database with a proprietary schema. One type of database that can be used is a relational database. The system automatically imports REUTERS DATASCOPE Fixed Income files that have been loaded by script from a file transfer protocol (FTP) site, but can also support receipt of data from other security master database sources such as BLOOMBERG. The database includes all relevant bond issue/issuer information required for the bond workflow. REUTERS DATASCOPE Fixed Income (an FTP-delivered subset of the EJV Rack data product) includes such things as issue/issuer ratings and actions, issue sizes, bond terms and conditions, administrative information, and issue identifiers.

Bond Queries

From the database of bond issues, a user can search for any bond. Queries can be done in any number of unique ways to find matching bonds. For instance, the user can specify the issuer name or a partial issuer name or a ticker, and be returned bonds from that issuer. Results can be narrowed by entering coupon and maturity date information. This information need not be exact, as the application allows functions such as >, <, and combinations thereof across both parameters to restrict the results returned. Bond issues may also be found through a search against CUSIP (Committee on Uniform Security Identification Procedures) and ISIN (International Securities Identifying Number) identification codes.

Axe-creation

The principal workflow handled by the system for the user is the creation, updating and deletion of axes. Axes may be described as an indication of a desire to buy or sell a bond at a dollar-price or a particular spread to a benchmark index yield such as that of a US (United States) Treasury instrument or LIBOR (London Interbank Offered Rate).

The system allows users to create an indication of interest to sell or buy a specific bond. Within the system, the user must first identify the bond. The most logical place from which axes can be created is immediately following the consummation of a trade. At this point, typically, a user either wants to re-offer a bond purchased or decrement an offering sold. Therefore, one implementation of the system includes being integrated with the client's trade capture system, with the system receiving a feed of message "exhaust" from the trade capture system in much the same way the client's settlement system receives messages from the trade capture system. Upon receiving notification of a consummated trade, the system will notify the relevant user(s). This notification will either be a prompt to create a new axe or to re-offer an existing axe.

Once the bond is identified, the user must select the benchmark against which the axe will be priced, the size to show, the price/spread he'd like to offer/bid and the venues to which he'd like to publish.

When publishing an axe, users may publish to a number of electronic venues in addition to the primary sales force. Possible venues include, but are not limited to, BONDDESK, TRADEWEB, MARKETAXESS, BLOOMBERG, and VALUEBOND and any other venue to which the dealer would like to publish prices. In addition to publishing to institutional salespeople, the system may enable a tiered offering, allowing publication of different prices to a secondary group of salespeople (e.g. client's regional dealer desk or middle market salespeople).

The system allows the user to select different sizes (e.g. quantity) and prices for each distribution channel to which they publish offerings. The user may also direct comments to salespeople and those external channels that allow trader-entered comments. The system provides a robust entitlement model to allow traders to have permission to "view only" specified trading books and to "view and edit" others.

Axe management may let traders efficiently manage positions and set axe pricing on multiple electronic platforms. Salespeople may see real-time axe updates and have easy access to prices and data.

Trade Idea Generation:

The system processes positions, trade history and market prices stored within the system to extract relevant trading ideas that can be proposed to a user. The system calculates whether bonds within the system are trading cheaply, historically or currently relative to other bonds, and can notify the user. The system also indicates to the user the most logical customers with whom to propose the trades based on their historical trading patterns or portfolio positions. The system may generates trade ideas automatically by processing all the information that underlies the fixed income market, such as positions on the desk, customer inquiry, activity and holdings, along with current market prices and market events, which may replace scratch pads and human memory with software algorithms that propose ideas to the user. Inquiries may be dynamically matched against axes, notifying both traders and salespeople when a match occurs. Salespeople and traders may be never more than a click away from a client's portfolio—even when a bond is not in inventory, salespeople have quick, convenient access to reports showing the largest holders of specific issues, all bond issues of an issuer, and individual customer portfolios. Salespeople may call up instant, customized views of "axe matches"—the intersections of inventory and customers' holdings. The system may continuously monitor inventory, client holdings, historical trades, and client inquiries to identify intersections likely to be trade opportunities. This means that traders and salespeople may be instantly notified when their interests align. By recognizing such "matches," as well as more complex relationships between data sets, the system may deliver a steady stream of potential trades.

Bond "Benchmark" Creation

The system enables traders to define a group of bonds that represent most actively watched issues in the market. The most actively watched issues in the market can be defined by the traders, or according to any other schema. Traders can update pricing for those issues, indicating both sides of the market as well as their preferred side of the security (bid/offer or both), and then publish these pricing indications to salespeople. This component replaces the typical BLOOMBERG runs or emails that are conventionally used to disseminate this information.

View Customer Inquiry

Traders can see customer inquiries provided to them by salespeople regarding interest customers may have in doing trades in the marketplace. Traders can then access a list of all axes to which they have "edit" rights that match against an inquiry.

Update Ticker

Traders (and salespeople) are provided with a view of all pricing and spread changes for existing axes as well as new axes created by traders via an Update Ticker. They can scroll back the Update Ticker to see all changes and updates to axes and inquiry over a prior period. Traders can choose to update those salespeople (or customers directly) via email or BLOOMBERG with a single mouse click.

When salespeople create an inquiry based on interest from their customer, traders are notified via the update ticker. Traders are also notified if one or more axes they are entitled to edit have matched against an inquiry. Traders may navigate from the inquiry update directly to the specific inquiry from the Update Ticker.

If salespeople indicate pricing on a "specific" bond inquiry (as opposed to a "group of bonds" inquiry where generalized bond parameters for one or more bonds may be defined), traders must approve and publish the correct price out to the remaining sales force (assuming the salesperson originally published the inquiry to other salespeople).

Dynamic Portfolio System—Issue Query

The system maintains a proprietary database of investor's holdings as well as basic customer contact information. This component of the system is referred to as the Dynamic Portfolio System (DPS). The system automatically imports EMAXX holdings from a source such as LIPPER via a script from an FTP site. The system also allows salespeople or other users to import customer holdings provided in spreadsheets. Details of the import function are provided in further detail below.

From this holdings database, traders can run certain queries to access the investors' holdings. In one implementation, this data is used to view a list of known investors who hold some bonds of a particular issue. In much the same way that a trader can specify a bond issue for which he would like to create an axe, the trader can identify bond issues and do an investor search, identifying all investors who hold (or recently held) that issue. With respect to the DPS, traders have the same functional capabilities as do salespeople. The DPS will be discussed in greater detail below.

Dynamic Portfolio System—Issuer Query

The system allows traders to query the database to identify those investors that have accumulated holdings across a number of issues from one issuer. So, for example, a trader can focus on who the largest investors are in CONAGRA as a whole, rather than just who are the largest investors of a particular CONAGRA issue.

Dynamic Portfolio System—Investor query

The system allows traders to search a list of a large number of investors provided by EMAXX, as well as any not covered by EMAXX but uploaded by the clients' sales force, and view the bond holdings of that investor. The data is configured such that it can be viewed on a sub-account by sub-account basis.

Quick Filter

Users can apply a filter to axes in the MarketView, by defining up to six filtering parameters. These parameters can display results based on either the intersection or the union of the parameters, or combinations of both. Parameters for filtering include, but are not limited to: ask/bid price, ask/bid spread, ask/bid yield, coupon, coupon type, dealer, domicile, industry, issuance date, issue size, issuer, market, maturity, MOODY's rating, position, quantity ask/bid, S&P (standard and poor) rating, series, subindustry, ticker, trader, and trading book. A link is provided from the Quick Filter to the Detailed Filter and Search so that re-keying of search parameters is unnecessary.

Detailed Filter & Search

Users can search the complete universe of securities in the system's Security Master Database. Up to six parameters can be defined, with the results being either the intersection or the union of the parameters, or combinations thereof. Returned results can be set to identify those securities that are also axes. These axes can be displayed with or without their axe-specific fields (quantity, spread, benchmark, yield, etc). Bonds in the Security Master Database that are not axes do not contain certain fields (bid and ask quantity, for example). Searches on these parameters are not allowed within the Detailed Filter as they would be meaningless.

The system is preferably implemented according to an architecture in which clients have their own key software components and services. In some implementations, instead of an end-to-end solution, the system provides a critical mass of key services based on an open Service Oriented Architecture (SOA) built using proven technologies. SOA may be described as a federation of cooperating and loosely coupled services, implemented using technologies not only such as DCOM (Distributed Component Object Model), CORBA (Common Object Request Broker Architecture), Sockets, FTP, etc., but extended with standards-based technologies such as JMS (JAVA Message Service), Web Services/SOAP (sometimes referred to as Service Oriented Architecture Protocol), XML (eXtensible Markup Language), etc.

The system core can be architected based on a pragmatic SOA. For example, rather than using Web Services (with severe performance implications), the reference implementation uses proven JMS technology. However, one or more external services can be non-JMS based. In such cases, an adapter layer will be provided to address the integration requirements of the specific protocol.

System Core

Client applications are tightly integrated with desktop software commonly used by trading and sales desks. For example, client applications can leverage desktop tools such as Microsoft Excel. The system core is platform neutral, is able to efficiently distribute large quantities of data, and is able to scale to hundreds of concurrent users, while being able to be easily maintained and upgraded.

The system is designed as a three-tier distributed system. The three tiers include the client (view) tier, the business tier (controller), and the Enterprise Information System (EIS) (model) tier, which are may reflect a model-view-controller paradigm. Communication among the three tiers is accomplished via exchange of request and response messages. The transport layer in the client and business tier is highly abstract. This allows the actual transport implementation to be swapped with relative ease. For example, even though the classic SOA is based on Web Services/SOAP, in one implementation the system uses JMS as it provides better performance, scalability, security, and management. However, if necessary, the JMS transport can be augmented or replaced entirely with equivalent Web Services/SOAP transports.

Business services have been designed to support both local (in-process) and distributed implementations. The design provides some key abstractions—namely, well-defined interfaces—that help to create and integrate different implementation of a service.

FIG. 1 is a functional block diagram of a bond trading system 101. As shown in FIG. 1, the system is embodied as an application, and is organized in three logical tiers:

The client tier 102: The applications user interface responsible for managing the interaction with the end users.

The middle/business logic tier 103: A server to process requests made by the users in the presentation tier. This tier provides access to business services. Business services may be hosted in-process or remotely.

The Enterprise Information System (EIS) tier 104: The EIS tier that provides access to the database and any existing enterprise systems.

In implementations, the client tier may include four main components: 1) Trader/Salesperson/Analyst application; 2) System Monitoring; 3) Reference data and 4) entitlement administration. The business logic tier has three major components: 1) Emissary; 2) Business Services; and 3) Rules Engine. The EIS tier includes two components: 1) Database; and 2) Other enterprise information repositories such as LDAP (Lightweight Directory Access Protocol), file system, etc. These tiers will now be explained in further detail below.

As an example implementation, in FIG. 1, the client tier 102 includes a trader/salesperson application 105, which includes a bond graphical user interface (GUI) 106; a monitoring application 107; and an entitlement administration application 108. The middle tier 103 includes a business logic server 109, which includes an Emissary 110 and business services 111; and a rules engine server 112, which includes an Emissary 113 and rules engine 114. The EIS tier 104 includes a database server 115, which includes persistence 116.

Figure 2:
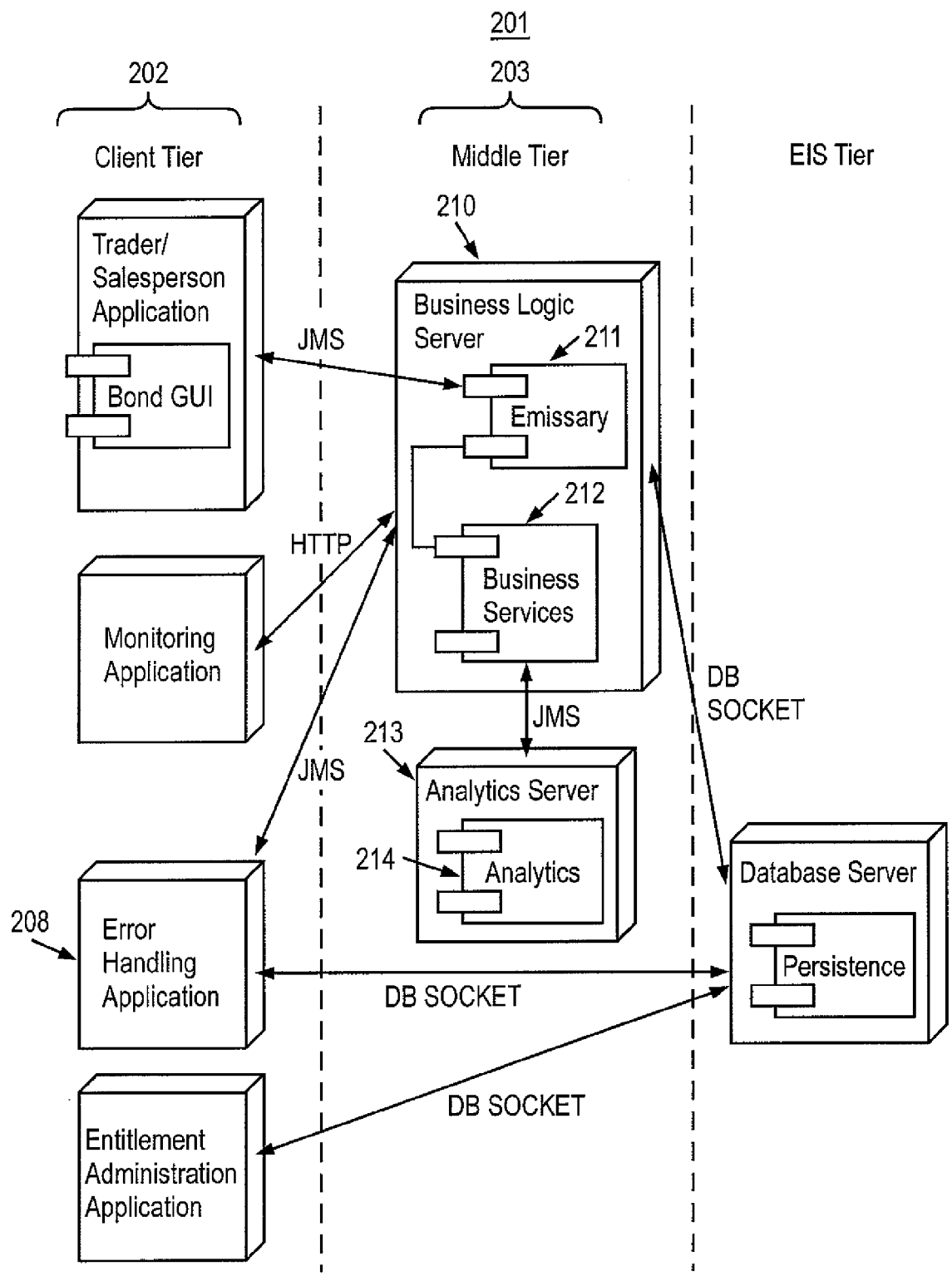
FIG. 2 illustrates a business logic tier with a remote analytics services configuration.

Although the business logic tier is shown in FIG. 1 as being in-process, one or more of the actual implementations may be hosted remotely. For instance, if an external analytics engine is present and has been architected as a true service—e.g. it exposes its functionality via a well-defined API (application programming interface) that can be accessed by out-of-process clients, the business logic tier can be easily configured to call out to the analytics service at appropriate points while a request is processed. In fact, the business logic tier will not notice any difference between an in-process and a remote analytics engine. FIG. 2 shows the scenario described above.

FIG. 2 illustrates a business logic tier 203 with a remote analytics services configuration. In a system 201 of FIG. 2, a client tier 202 includes an error handling application and logic (middle) tier 203 includes a combination of a business logic server 210, which includes an Emissary 211 and business services 212; and an analytics server 213, which includes analytics 214.

Client Tier

In general, a client tier includes applications that interact with the Middle Tier via request/response messages. Typically, these client applications are graphical user interfaces (GUIs), such as the bon GUI 106 of FIG. 1. However, any application that implements the message API can interact with the Middle Tier.

The GUI may take an optimistic approach to the manipulation of business objects. The creation, update or deletion of a business object does not need to be confirmed by the back-end before it is immediately reflected in the GUI. Conflicts are resolved at the server. Conflicts are expected to be rare and the responsiveness of the GUI should not suffer in order to accommodate this work case scenario. When a conflict is detected—e.g. two clients updating the same business object—an error message is sent to the GUI that needs to update its state.

Middle Tier

The Emissary and Business Services are grouped together into the Business Logic Server (BLS). Within the BLS, the Emissary is the point of contact for communicating with the user, servicing user requests, maintaining user state, applying entitlements, and distributing information to the users. The Emissary makes calls to the Business Services component which is responsible for the management of domain business. These services are typically not aware of the user.

Communication between these two components is preferably via a synchronous API interface, although other interfaces may be used. The synchronous API provides a layer of indirection so that both local and distributed implementations can be provided. A local implementation can be based on normal JAVA classes, while a distributed implementation can be based on a distributed call, such as a call to a distributed process using JMS, SOAP, or J2EE (JAVA 2 ENTERPRISE EDITION) Session Bean over RMI (Remote Method Invocation).

There are differences between synchronous/asynchronous processing models. Asynchronous behavior imposes significant design and development overhead. For example, accessing an asynchronous service implies that the caller must be prepared to receive the response at some point in time after the request has been submitted. As a result, the caller may be required to cache the session state. Furthermore, the caller may need to be prepared to roll back state changes if the request fails. On the other hand, the synchronous interface may allow for the caller to know if the call succeeded or if an exception was raised. This may be very useful in terms of grouping closely together the call to the business service and any compensating actions based on the failure of call to the business service. It also may make testing the business service API much easier.

In some cases, a business service will only be available asynchronously. For such cases, a wrapper service is provided. This wrapper service encapsulates the complexity of asynchronous processing and presents a synchronous interface to the Emissary. As a result, the Emissary is unaware that it is interacting with an asynchronous business service.

Business objects provide the domain model and encapsulate the data as well as behavior. These business objects are plain old JAVA objects (POJO). The business server API is largely written in terms of these business objects. Other system services, such as communication or monitoring, are also based on the same Abstract Factory design as the Business Services. Most, if not all, of the software developed can run both in and out of an application server container. As a result, the use of EJB (Enterprise JAVABEANS) becomes a deployment choice rather than an integral part of the architecture.

Rules Engine

Figure 3:
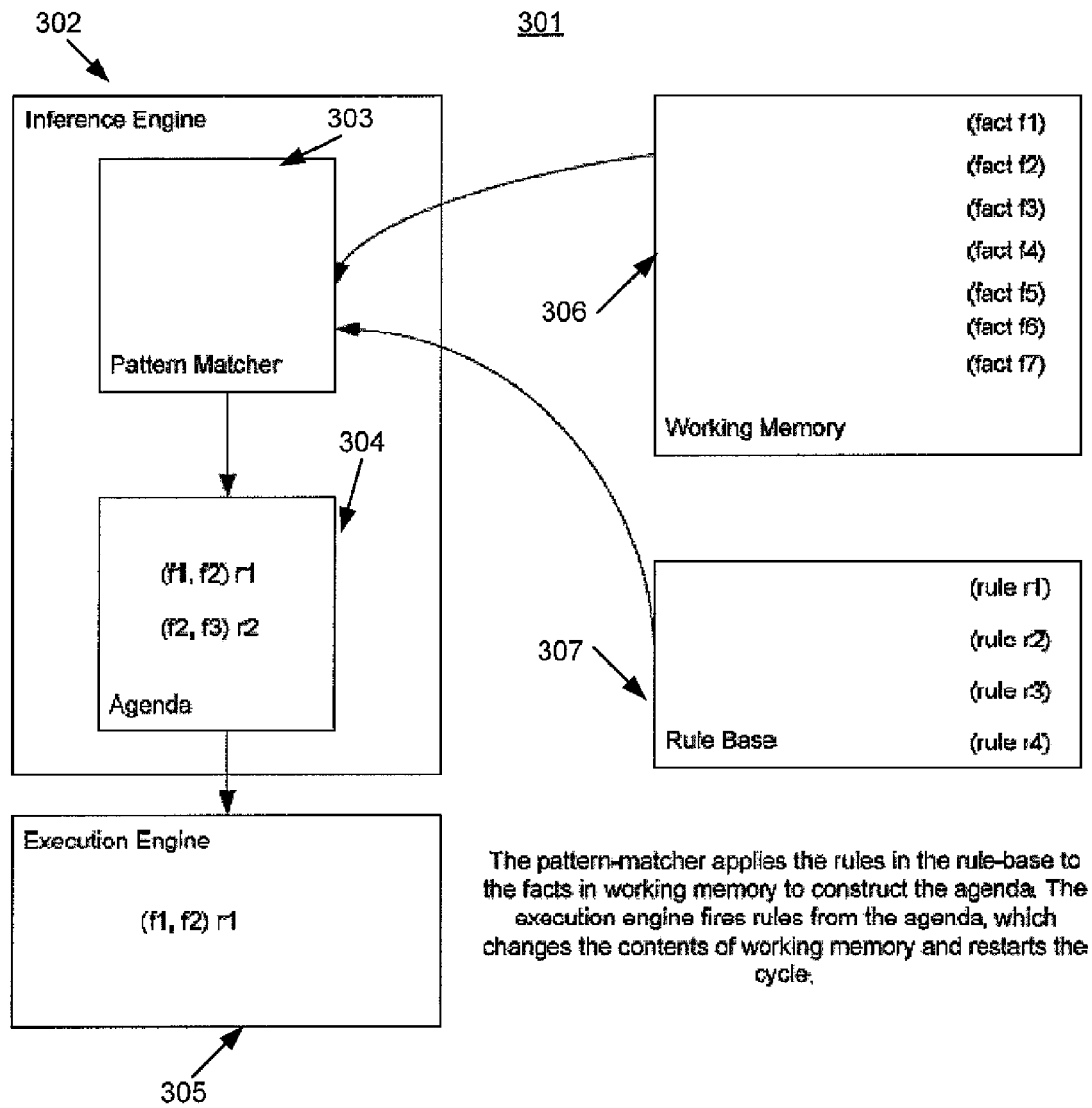
FIG. 3 illustrates process execution by a rules engine.

In preferred implementations, the rule engine includes an inference engine, an execution engine, a working memory, and a rule base. This basic architecture is shown in FIG. 3. A rule base consists of the rules that have been loaded into the engine. Rules are typically loaded when the engine is initialized. The working memory contains all facts that have been loaded into the engine. Unlike the rule base, working memory is more volatile. For example, when a rule is fired it may change the working memory by asserting, updating, or retracting facts.

The pattern matcher is responsible for applying rules to the contents of working memory to create the conflict set—e.g. the set of unordered rules that are candidates for execution. After constructing the conflict set, the inference engine applies various strategies—only some of which are exposed via the rules engine API—to order the conflict set and create the agenda. The rule engine takes into account the specificity of rules and the relative age of the premises in the working memory during conflict resolution. Finally, the first rule on the agenda is fired (possibly altering the working memory) and the entire process is repeated.

FIG. 3 illustrates process execution by a rules engine 301. The rules engine 301 includes an inference engine 302, which includes a pattern matcher 303 and agenda 304; an execution engine 305; a working memory 306; and a rule base 307. In the rules engine 301, the pattern matcher 303 applies rules in the rule base 307 to facts in working memory 306 to construct the agenda 304. Rules from the agenda 304 may be executed by the execution engine 305, which may change contents of working memory 306 and may restart a cycle of process execution.

Figure 4:
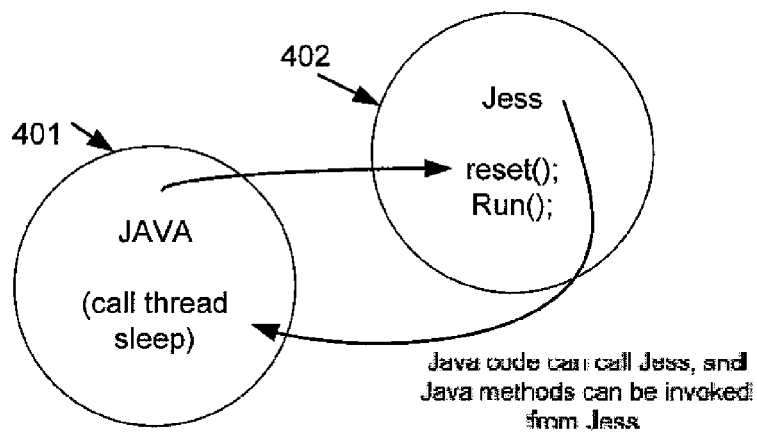
FIG. 4 illustrates process execution of an in-process rules engine.

The rules-based system Jess (JAVA Expert System Shell) is used in some implementations of the rules engine because business logic is externalized, allowing rules engine behavior to be modified by editing rule files rather than modifying application code. Further, Jess uses the Rete algorithm for efficiently matching rules against working memory. And, since Jess is written from the ground up in JAVA, it provides excellent support for integration with JAVA applications. FIG. 4 illustrates process execution of an in-process rules engine. As shown in FIG. 4, JAVA applications 401 can call into a Jess rules engine 402 and Jess scripts of the Jess rules engine 402 can call into the JAVA applications 401.

The rules engine may be used to identify matching between inventory, client holdings, inquiries, and historical trades as part of workflows. In the context of the system a fact may refers to business objects of interest. For example, trades, axes, and inquiries can all be considered facts.

In Process Rules Engine

Figure 5:
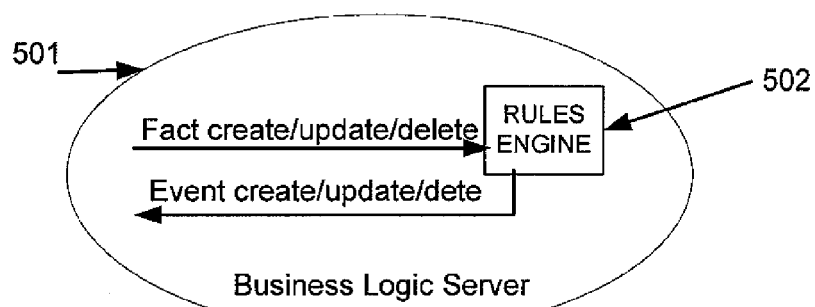
FIG. 5 illustrates process execution of an out-of-process rules engine.
Figure 5:
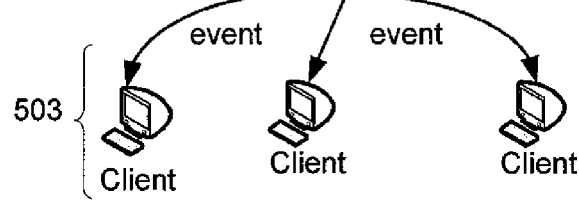

When deployed with the in-process rules engine configuration, the Business Logic Server contains an embedded rules engine. As shown in FIG. 5, in this configuration the BLS interacts directly with the rules engine. FIG. 5 illustrates process execution of an out-of-process rules engine. In FIG. 5, the business logic server 501 includes an embedded rules engine 502, where fact creation, updating, and deletion and event creation, updating, and deletion are within the business logic server 501, and events are sent to clients 503.

This configuration can be used by applications where the number of rules is small and the rate of change in facts is low. Since this deployment configuration has a direct impact on the BLS performance a recommended configuration is the out-of-process rules engine, as described below.

Out of Process Rules Engine

In the out-of-process rules engine configuration, the BLS integrates with the Rules Engine Server (RES). This provides high scalability and is a preferred configuration. As a number of rules and facts grows, the RES may be deployed on high performance hardware. Accordingly, the rule base can be partitioned amongst multiple RES processes—each RES process potentially running on separate hardware—to achieve the desired performance levels.

Figure 6:
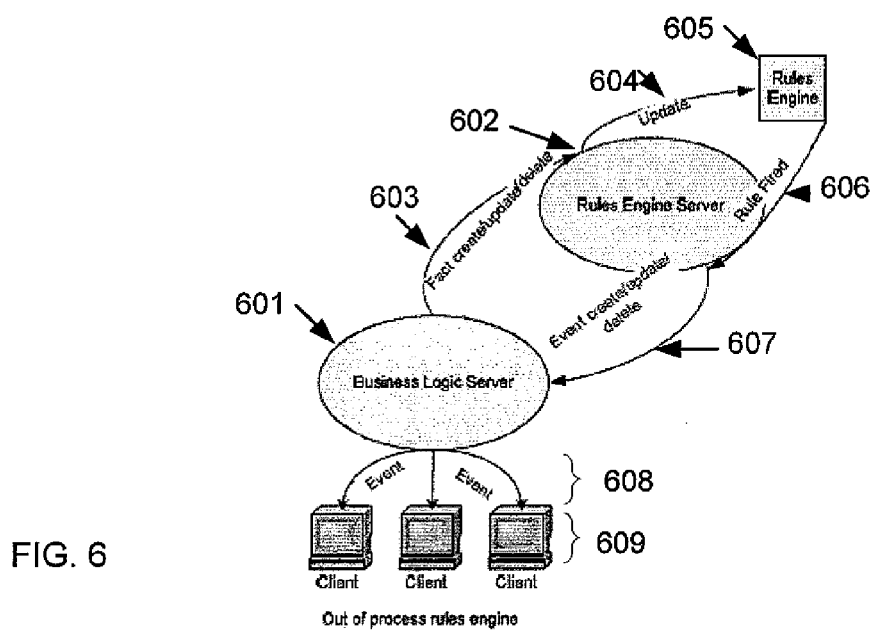
FIG. 6 shows workflow execution and interaction between the BLS and RES.

FIG. 6 shows workflow execution and interaction between a BLS 601 and RES 602. As shown in FIG. 6, interaction between the BLS 601 and the RES 602 includes well-defined workflows. First, whenever a new fact is created/deleted/updated by the BLS 601, a notification 603 is sent to the RES 602. This notification causes the RES 602 to update 604 the working memory of a rules engine 605. Second, whenever a rule is activated in the rules engine 605 and a new fact is created/deleted/updated 606, the RES 602 sends a notification 607 to the BLS 601. In turn, the BLS delivers this notification 608 to clients 609.

JMS Destinations

Clients may send login requests to an Emissary on the following login destination (non-exclusive queue): CSA.SERVER.LOGIN.

The JMS configuration on the client machine only includes the information necessary to connect to the login JMS daemon and the name of the login destination. Login requests sent by the client contain a response destination (temporary queue)—the Emissary sends the login response message to this temporary destination.

Figure 7:
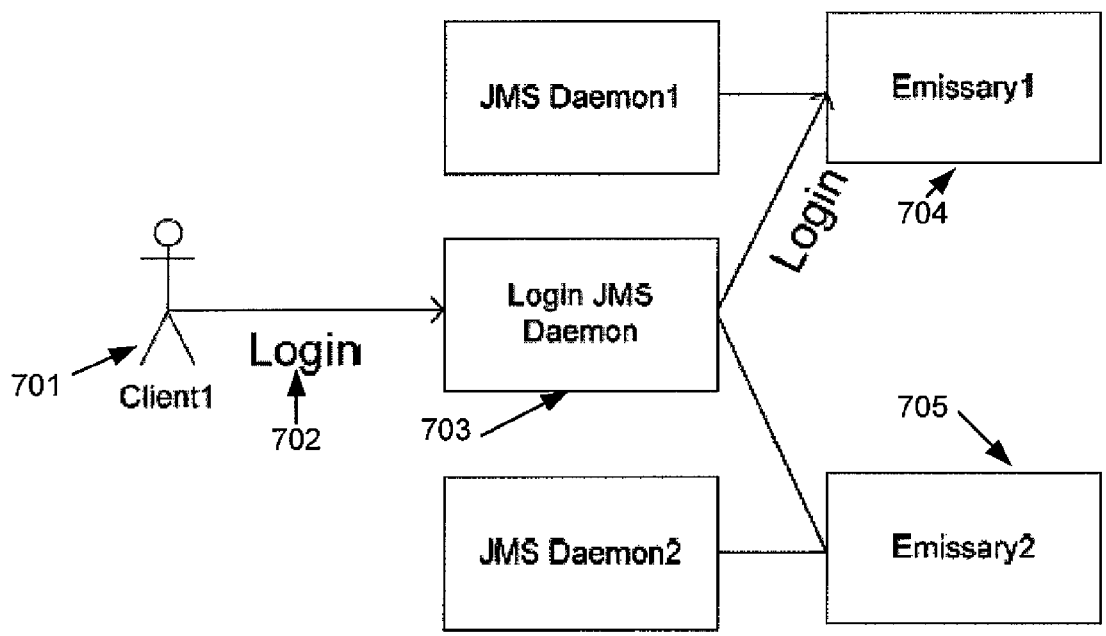
FIGS. 7 and 8 illustrate server login processes of the system.

FIG. 7 shows Client1 701 sending a login request 702 to the login JMS daemon 703. In this implementation, there are two Emissary processes 704, 705 listening for login requests. One of the two Emissary processes—in this case, Emissary1 704—accepts the login request. JMS queue semantics guarantee that exactly one Emissary process will receive a login request.

After accepting a client login request, an Emissary hosting the client session may send the JMS connection, topic, and queue information to the client in the login response message. The client uses the JMS connection, topic, and queue information to establish communication channels with its Emissary. All further communication between the client and its Emissary happens over these communication channels. In effect this strategy may act as a dispatcher of client connection requests and balance load amongst all available Emissary and EMS (Enterprise Messaging Service; e.g., such as TIBCO) servers.

This bootstrap procedure allows a client to configure itself dynamically. In addition, the system can be scaled on multiple levels—by adding additional JMS daemons and/or by adding additional Emissary processes. In fact, the system administrator can reconfigure the system without any modification to the client configuration.

Requests

All requests from clients may be published on the following queue: CSA.<ServerID>.REQUEST. Since all requests may be sent to a single well-defined queue, it is possible to assign priorities to messages. For example, in a trading system one might assign a higher priority to order messages as compared to instrument search messages. Position update and allocation (PAS) messages from external services are published on the following queue: CSA.SERVER.PAS—where PAS stands for Position and Allocation Service.

Trades capture (TCS) messages from external services are published on the following queue: CSA.SERVER.TCS—where TCS stands for Trade Capture Service. Business events generated by remote (out of process) rule engines are published on the following topic: CSA. SERVER.EVENTS.

Every request sent to the Emissary can be viewed (logically) as consisting of the following components: principal (user), action, and business object. For example, in a typical trading system a user might submit a request to create (action) a market order (business object). An entitlement check may be a matter of determining whether the principal is authorized to perform the specified action on the business object.

Response

Axe publication to external venues is done on the following queue: CSA.SERVER.ADS—where ADS stands for Axe Distribution Service. Messages published to internal venues by the Emissary can either be directed to a specific user (point-to-point semantics) or to a group of users (broadcast semantics).

A message published to a single user is published on one of the following topics: CSA.CLIENT.<UserID>—where <UserID> is an identifier of the client whose session is being established. This topic is used to send messages to a single client for asynchronous delivery. This topic is for situations where the client wants to send a request and does not want to wait for a response from the Emissary, and also where client-specific error messages are sent by the Emissary. A request message can have its JMSReplyTo property set. If the JMSReplyTo property is set on a request message the response is sent to this destination.

A message targeted to a group of users is published on the following topic: CSA.CLIENT.<Role>—where <Role> is one of the user roles defined in the system. A role is a logical way to group system users. For example, in a trading system the roles TRADER and SALES might be roles defined. Role based publication allows the Emissary to "fan out" messages in an efficient manner—e.g. a single message is published per role and all users in that role receive that message.

A message targeted to clients interested in activity on a particular logical business grouping such as an account, a trading book or research stream is published on the following topic: CSA.CLIENT.<interest>—where <interest> is an element with an enumeration such as a list of accounts, trading books, research streams etc. This distribution partitioning is suitable for a wide range of applications where real-time information is distributed according to a relatively fixed partitioning of interest.

Further efficiency can be gained by intelligent use of JMS selectors. For example, suppose a trade message is published on the topic CSA.CLIENT where ORDBKI is the name of the book in which the trade is being booked. A client wishing to receive notification of all activity in ORDBKI would simply subscribe to this topic. However, suppose another client wishes to receive all trade activity in ORDBKI for bonds from issuer DaimlerChrysler. This client could register a selector with EMS server on the topic CSA.CLIENT. ORDBKI—the selector would filter out all messages that are not trade messages and which do not carry the ticker symbol DCX. Of course, the Emissary would be required to put the message type (e.g. trade) and the ticker symbol of the issuer as properties of the message. This is an optimization because filtering is done on the EMS server instead of on the client.

Figure 8:
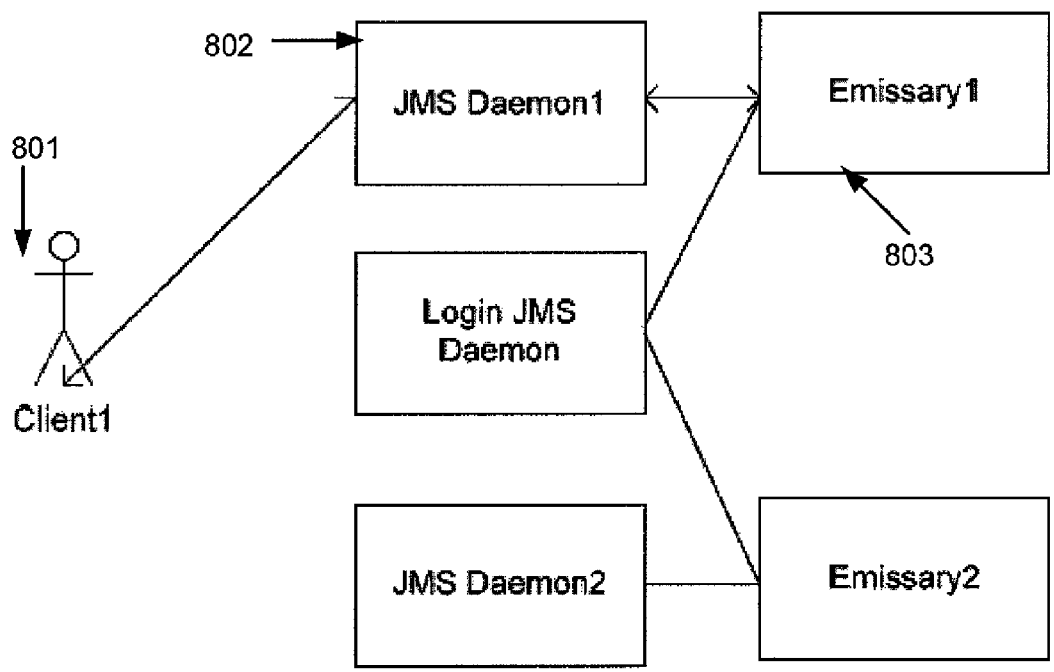

FIG. 8 illustrates server login processes of the system. As shown in FIG. 8, after a client session has been established, all communication between the client 801 and the host Emissary 802 is brokered by the Emissary's JMS daemon 803. In a typical deployment, where the number of users is small, a login JMS daemon and JMS daemon that brokers non-login messages may be one and the same.

Heartbeat Messages

Emissary processes publish heartbeat messages on the following topic: CSA.CLIENT.HEARTBEAT—the heartbeat message contains the name of the emissary, the heartbeat interval, flag to indicate whether the Emissary has encountered severe errors, and a description of the error condition. Any client that wishes to monitor the health of an Emissary can subscribe to heartbeat messages from that Emissary instance.

Emissary processes subscribe to heartbeat messages on the following topic: CSA.SERVER.HEARTBEAT—the heartbeat message contains the name of the emissary, flag to indicate whether the client has encountered severe errors, and a description of the error condition. For example, the position update service will publish heartbeats on this topic.

JMS Configuration

JMS configuration is externalized from the code by XML deployment descriptors. In particular, the configuration required on the client tier has been minimized in order to allow easy management of deployed client applications. The only JMS configuration required on the client is the URL (uniform resource locator) of the JMS daemon to which the application needs to connect. All other JMS configuration—TOPIC, QUEUE, etc.—is sent to the client by the server after login is complete.

The Middle Tier configures its JMS artifacts using XML deployment descriptors. These full-featured deployment descriptors allow configuration of all aspects of the JMS layer—e.g. CONNECTION, SESSION, TOPIC, QUEUE, etc. The JMS artifacts are created when the Emissary process starts.

Session Management

The middle tier is responsible for managing user sessions. However, the client tier has to be session aware for handling certain error conditions. For example, if Client1 is connected to Emissary1, suppose that Emissary1 has published a message to Client1 and that Client1 fails before consuming the message. Furthermore, suppose that the message is persistent and does not expire. Now, Client1 restarts. The message from the terminated session will be delivered to Client1. In this case, Client1 must discard all messages that are not from the current session.

Heartbeat

Heartbeats are used to detect the presence or absence of client processes. The ability to detect when a client process is no longer active can be helpful in managing abnormal session termination. In some implementations, the capabilities of the transport layer are leveraged to manage client sessions. The transport layer can be configured to publish monitor messages, such as when a client attempts to connect to the JMS daemon or when a client connection is disconnected.

Middle Tier Operation

The flow and organization of the processing in the Emissary is substantially as follows. A message may be received from the EMS daemon, and compared against selection criteria in order to select a processing pipeline. The processing pipeline is responsible for implementing all of the functionality required by the use case in servicing the user request. Most pipeline elements are reusable across use cases, such as session and entitlement check as well as encapsulating sending messages to users or other external systems.

Some pipeline elements are use case specific, typically those that deal with the creation or manipulation of some business entity. The operations that take place on the business objects, primarily CRUD (Create, Read, Update, and Delete) manipulation, are done by classes that sit behind a set of interfaces known as "Business Services." These services are grouped into several subsystems, such as an interface for Offering manipulation and another for Trade manipulation. In most cases, a data mapper is used to transfer data between the domain model and the database. The data mapper allows the database schema and the object model to evolve independently.

An Emissary writes the state of all its hosted sessions in the database and not cache any state related to a client session in memory. As a result, each Emissary can be viewed as a set of stateless session beans (SLSB). When an Emissary process terminates, all sessions being hosted by that Emissary are orphaned. Requests from these orphaned sessions cannot be serviced. All orphaned sessions have to be reestablished by logging into another Emissary. The re-login may be initiated by the client and this is the simplest way to migrate orphan sessions to another Emissary. However, the list of sessions that were being hosted by the terminated Emissary is available in the database. This information can be used to seamlessly migrate orphaned user sessions to another Emissary process. Here is the sequence of steps that would occur to accomplish the migration of orphaned sessions to another Emissary: a connection between an Emissary and its JMS daemon is terminated (this may happen if the Emissary fails, or the network connection between the Emissary and its daemon fails, or the JMS daemon itself fails); in the last case (failure of the JMS daemon) the client immediately knows of the failure because its own connection to the failed JMS daemon is terminated and the client can re-initiate login; in the first two cases clients whose session is being hosted at the failed Emissary are unaware that the Emissary has failed, they experience request timeouts; all Emissary processes subscribe to EMS advisory messages; an EMS server can be configured to publish advisory messages whenever some event of interest occurs (e.g., EMS can be configured to publish advisory messages whenever a client connects to the daemon or disconnects from the daemon); another Emissary that is connected to the same JMS daemon as the failed Emissary receives an advisory message from EMS; the receiving Emissary extracts the name of the failed Emissary from the advisory message; the receiving Emissary loads the state of the orphaned sessions from the database; and the receiving Emissary notifies the clients of the orphaned sessions that they should forward all requests to it instead of the failed daemon. In a typical deployment a single Emissary will interact with a single database. However, in a geographically distributed deployment it might be desirable to 'push' the persistent data as close to the local Emissary as possible. This may be necessary to avoid a performance hit of database accesses over a WAN (wide area network). At the very least, it is imperative that read-only data—e.g. security reference data—be delivered to the Emissary from a local database.

Pipeline Design

The processing stages upon receipt of an incoming user request are handled by a processing pipeline. This pipeline design is based on a so-called "Pipes and Filters" architectural pattern, in which the task of a system is divided into several sequential processing steps. Each processing step is implemented by a filter component. The filters are connected by pipes, and the output of one filter is used as the input to the subsequent filter. The sequence of filters connected by pipes is collectively known as a processing pipeline.

A familiar example of this pattern comes from program codes where commands like 'ls' and 'sort' are joined by a pipe in order to perform linked processing steps. Translating this design to an object model yields a Module object that represents the filter and a data structure, PipelineData, which is passed to each Module's processing method. The collection of Modules that gets sequentially executed is represented by a Pipeline. The execution of the pipeline consists of sequentially calling each Module's processing method. In the case of a processing exception, a rollback method is called on each Module in the pipeline. The modules are called in reverse order and exclude the module from which the exception was thrown.

Reactor Design

In message-based middleware the message callback function is called upon receipt of a message and the logic to determine what processing steps should be taken is determined by examining the contents of the message. The Reactor architectural pattern is used to organize the logic that determines what processing pipeline will be executed.

The pattern has two key participants; a Handler and a Reactor. The Reactor receives asynchronous messages from a messaging system and reacts to the stimulus by querying a set of registered Handlers to determine if they are eligible to process the message. The Handler encapsulates the selection criteria of the message that must be satisfied in order to execute a specified processing pipeline, an optional select of a synchronous lock based on message field value, and an exception module that is called in case of a pipeline exception after a pipeline rollback.

Message Processing

When an incoming message is received, a MessageReactor examines the message and determines which of the registered MessageHandlers should process the message. The MessageHandler is defined by several properties, the message selector (optional), error handler, required incoming message type (optional), and a processing pipeline.

Normal Flow

The following processing steps occur in the message handler for normal processing: 1. Unmarshal the incoming JMS message to a MessageForge/RMsg message object; 2. Compare received RMsg against the handler's message selector; 3. Compare received RMsg class to the one specified by the handler; 4. Validate received incoming RMsg; 5. Execute the target pipeline. 6. Upon successful execution send a ServerResponse message indicating to the client.

Error Flow

The following processing steps occur in the message handler for processing abnormal conditions:

1. Incoming JMS message cannot be unmarshaled to an RMsg. Send a ServerResponse message indicating the error to the client. Log error message on the server.

2. No matching pipeline. Call the generic error handler to send a ServerResponse message indicating the error is sent to the client and an error message is logged on the server. This error is categorized using the key, NO-MATCHING-SELECTOR-ERROR 3. Validation of RMsg fails, matching pipeline error module is called setting the PipelineException to the ErrorCode VALIDATION-ERROR.

4. Handler throws a PipelineException or a DAOException is thrown. Call the MessageHandler's error handler. The ErrorHandler is responsible for notifying the user about the error that occurred. There will generally be three categories of error handlers: GenericErrorHandler, <BusinessObject>ErrorHandler, and LoginErrorHandler. The GenericErrorHandler is responsible for sending a ServerResponse message type. The <BusinessObject>ErrorHandler is used when a request is made to update or delete a business object. It sends a <BusinessObject>Error message type that extends the ServerResponse message but in addition contains the latest state of the business object. The LoginErrorHandler is responsible for sending a ServerLoginResponse message type since all login errors are treated equally.

If there is an error while executing the error handler, a ServerResponse message indicating the error is sent to the client and an error log message is logged on the server. This error is categorized using the key, ERROR-HANDLER-NOT-EXECUTED. If the latest state of the BusinessObject can not be retrieved, typically because there was a database error that caused the pipeline to stop executing, then the <BusinessObject>Error will indicate this by setting the "ContainsNewstate" field to false.

In the case of not being able to convert to an RMsg (#1 in Error Flow), the JMS destination of the client is determined by looking in the JMS Properties for the field UserID. The other property fields, Workflow, Action, and CorrelationID are also extracted from the JMS Properties to create the ServerResponse message.

In the case that the JMS destination of the client can not be determined using the field UserID, the error message is sent on the TOPIC CS.CLIENT.ADMIN. If other required property fields, Workflow, Action, and CorrelationID are not present, they are set to the special value "UNKNOWN".

Before a module in the pipeline is invoked, the MessageHandler has already checked that the incoming RMsg message is 1) Not Null, 2) Valid, and 3) of the correct class expected by the module. Therefore, modules can safely downcast the object returned from the method PipelineData.getIncomingMessage( ) removing their need to perform any error checking, allowing them to concentrate on performing the "sunny-day" scenario.

Message Distribution

Incoming request messages—i.e. messages from a client to an Emissary—are routed to the Emissary that is hosting the client session. Outgoing response messages—i.e. messages from an Emissary to clients—are either directed to a specific client (point-to-point) or fanned out (publish-subscribe).

Figure 9:
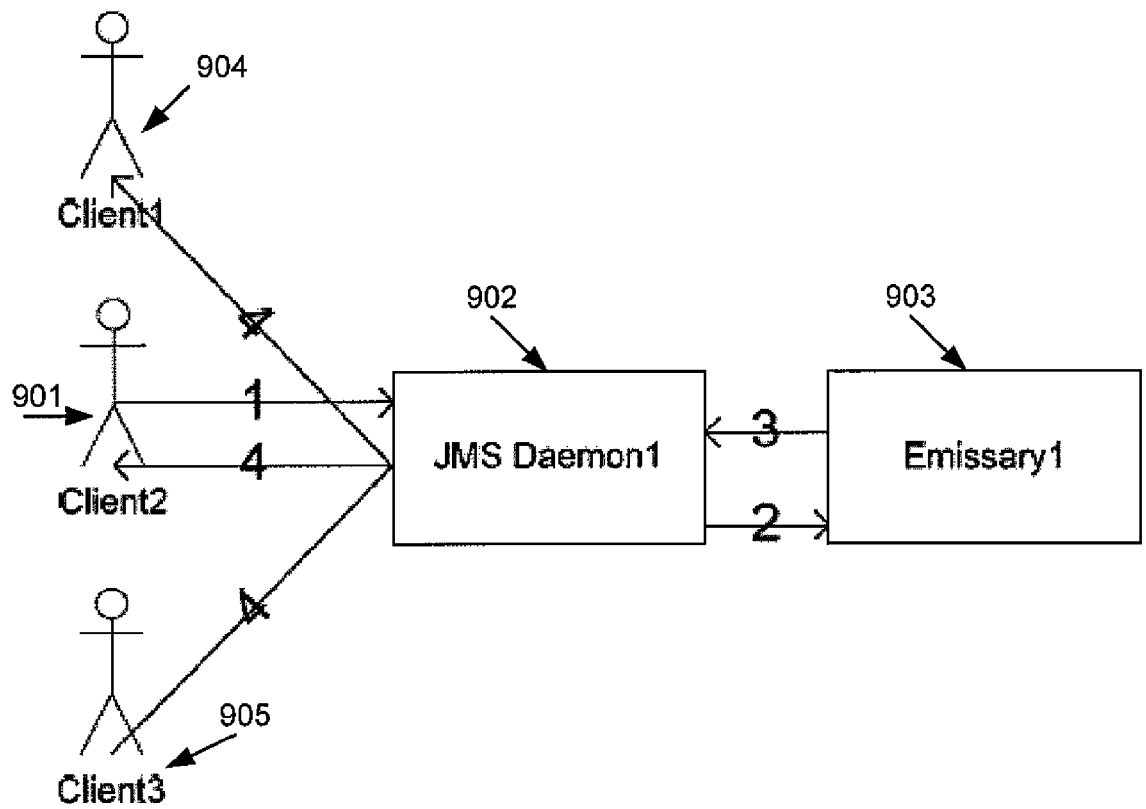
FIG. 9 shows the sequence of messages that are published during a typical fan out procedure.

FIG. 9 shows the sequence of messages that are published during a typical fan out. Client2 901 publishes a request in Step 1. The JMS daemon 902 delivers the request to the Emissary 903 in Step 2. The Emissary 903 processes the request and publishes a fan out response in Step 3. The JMS daemon 902 delivers the response to all subscribers 901, 904, 905 in Step 4.

In a deployment with multiple JMS daemons, it is necessary to provide a mechanism for inter-daemon routing of messages in order to provide correct message fan out (publish-subscribe). Otherwise, messages published on one JMS daemon will not be delivered to clients connected to other JMS daemons. One implementation includes having each Emissary publish messages to all known JMS daemons. In order to do this, each Emissary would have to connect to every JMS daemon and publish each message to all JMS daemons. Alternatively, the built-in message routing capabilities of the EMS can be leveraged, which allows routes to be established between EMS servers. Each route connects two EMS servers and forwards messages between corresponding destinations (e.g. destinations of the same type, with the same name) two servers. Routes can be either 1-hop or multi-hop. Every time a message is forwarded on a route its hop count is incremented. As the name 1-hop suggests, messages can get forwarded at most one hop.

Figure 10:
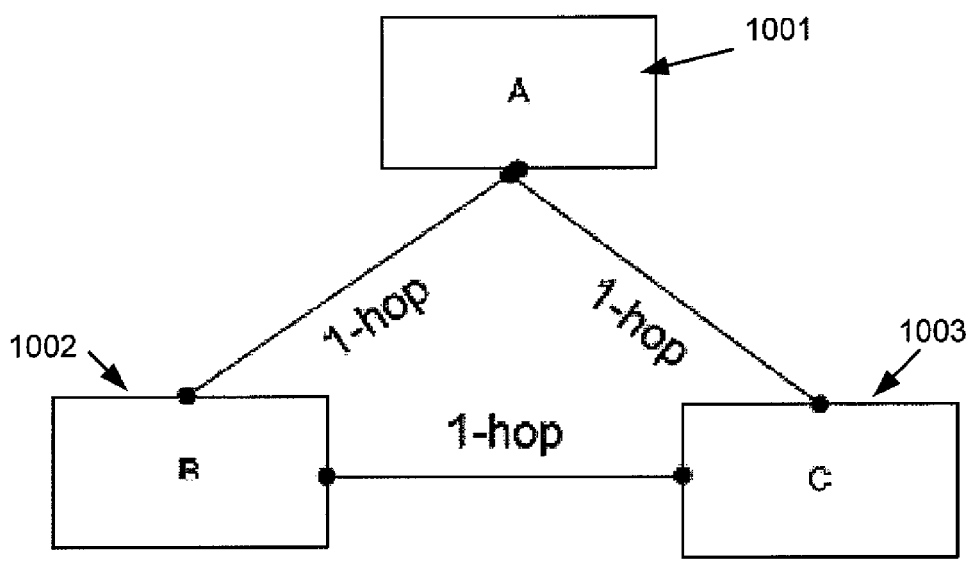
FIG. 10 shows deployment with three fully connected EMS (Enterprise Messaging Service) servers.

FIG. 10 shows a deployment with three fully connected EMS servers 1001, 1002, 1003. Each server in this deployment forwards its messages to every other server. A message published to server A 1001 on the 1-hop route will get forwarded by server A 1001 to servers B 1002 and C 1003. However, the message that was routed to servers B 1002 and C 1003 will not get forwarded any further since the routes are 1-hop.

Messages on multi-hop can get forwarded more than one hop. This creates the potential for cycles. Consider the deployment described above with fully interconnected servers A 1001, B 1002, and C 1003. If the routes between the servers were multi-hop then a cycle would exist because a message published could reach a server by more than one path. For example, a message published to server A 1001 on the multi-hop route will get forwarded by server A 1001 to servers B 1002 and C 1003. Servers B 1002 will, in turn, forward the message to C 1003. Thus, C 1003 will receive the message via two distinct paths.

Figure 11:
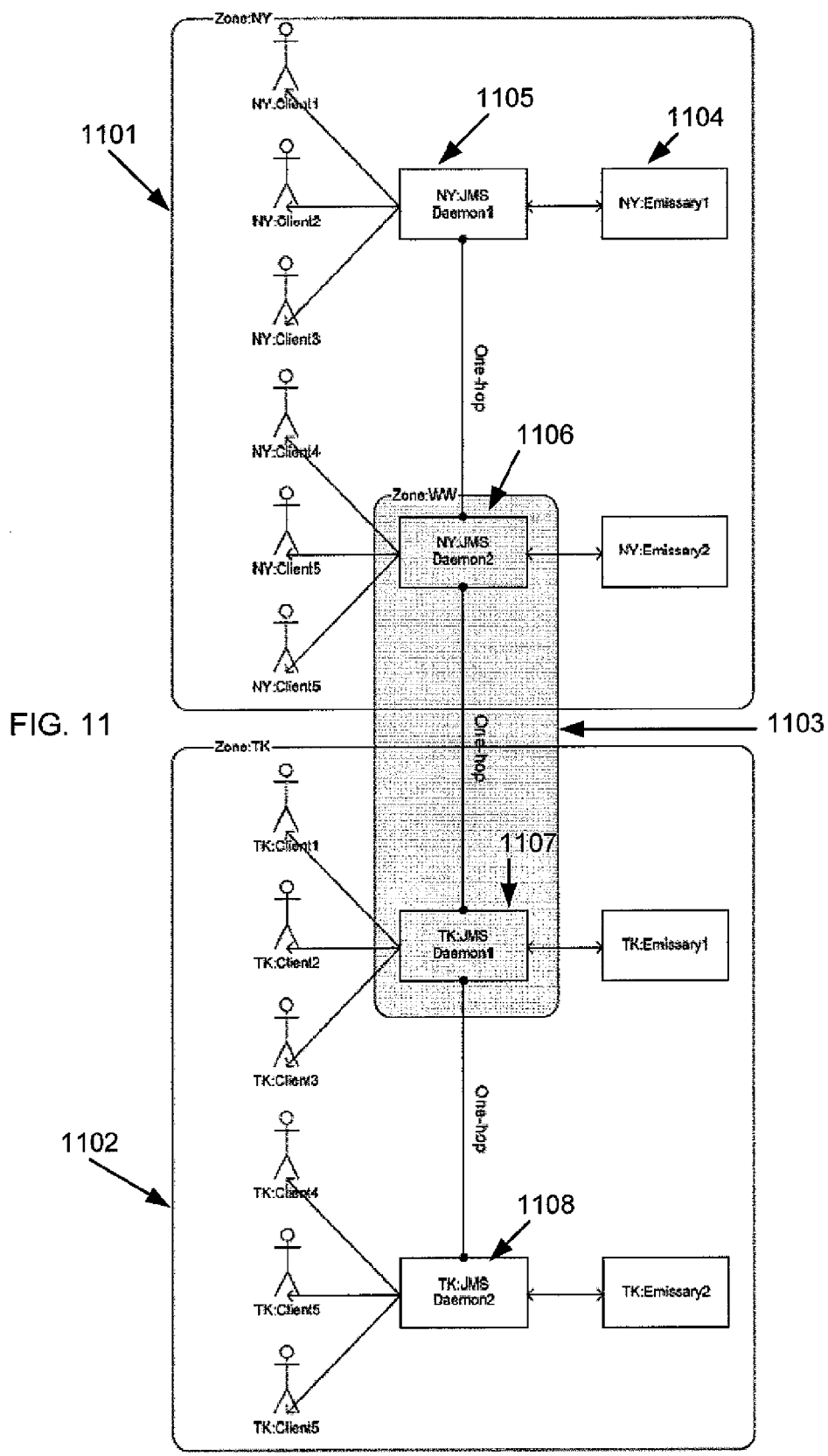
FIG. 11 illustrates communications within multiple overlapping zones in a geographically distributed architecture.
Figure 12:
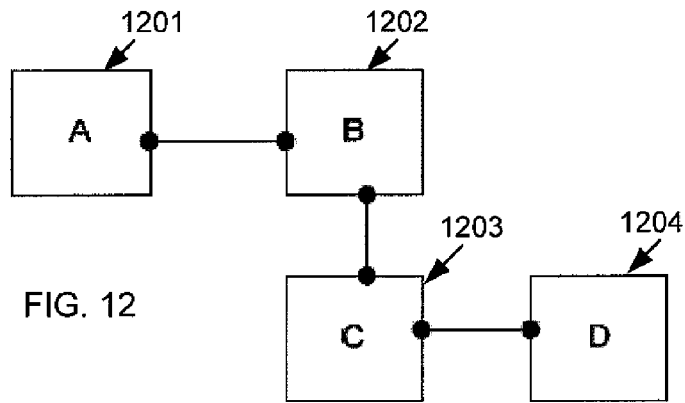
FIGS. 12-15 illustrate communication failure handling techniques among interconnected servers of the system.

When a deployment is geographically distributed, with each geographic location running multiple JMS daemons, connecting the two locations may be best achieved by setting up zones. Zones allow complex routing to be developed using 1-hop routes. Basically, when a message crosses zone boundaries its hop count is reset to zero. FIG. 11 illustrates a configuration in which there are two zones—NY 1101 and TK 1102. In addition, there is an overlapping zone—WW 1103.

When a NY:Emissary1 1104 publishes a message to NY:JMS:Daemon1 1105, the message travels one hop to NY:JMS:Daemon2 1106. When the message reaches NY:JMS:Daemon2 1106, it crosses into zone WW 1103 and its hop count is reset to zero. Since the hop count of the message is zero, NY:JMS:Daemon2 1106 forwards the message to TK:JMS:Daemon1 1107 where the message crosses zone boundaries again and enters zone TK 1102. TK:JMS:Daemon1 1107 forwards the message to TK:JMS:Daemon2 1108.

Fully Connected Deployments

Figure 13:
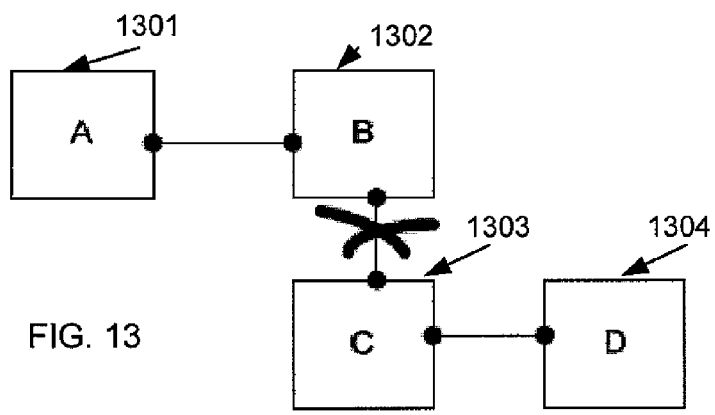

FIGS. 12-15 illustrate communication failure handling techniques among interconnected servers of the system. In general, routing messages between JMS daemons can be achieved in several ways. Consider FIG. 12 in which four servers 1201, 1202, 1203, 1204—within the same zone—are connected via m-hop routes. A message published on a server is routed to all the other servers. A network failure occurring between servers B 1302 and C 1303, as shown in FIG. 13, partitions the deployment into two groups. Routing still occurs between severs within the groups. For example, a message published on server A 1301 will reach server B 1302. However, no routing occurs across groups. For example, message published on server A 1301 will not reach server C 1303 or server D 1304.

Figure 14:
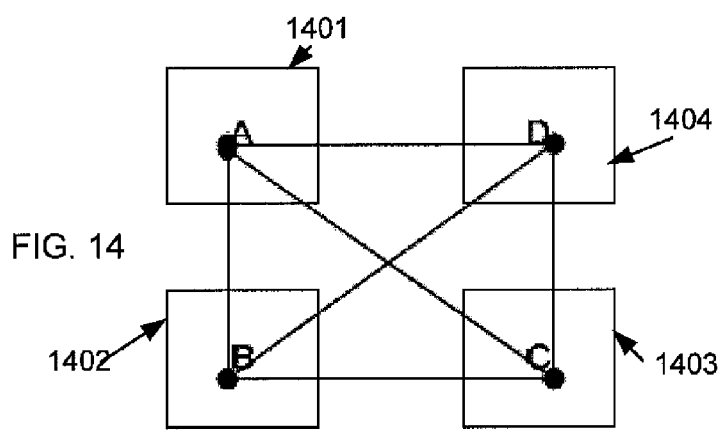

A way to avoid this type of partitioning is to deploy fully interconnected servers. FIG. 14 shows four servers 1401, 1402, 1403, 1404 fully connected via 1-hop routes. As before, a message published on any server is routed to all other servers. Note, m-hop routes cannot be used with this routing topology because it would create a cycle in the routing graph. A cycle exists if there is more than one routing path between two servers. If the routes in FIG. 14 were m-hop then redundant paths would exist between server A 1401 and C 1403 (one direct, one through server B 1402, and one through server D 1404).

Figure 15:
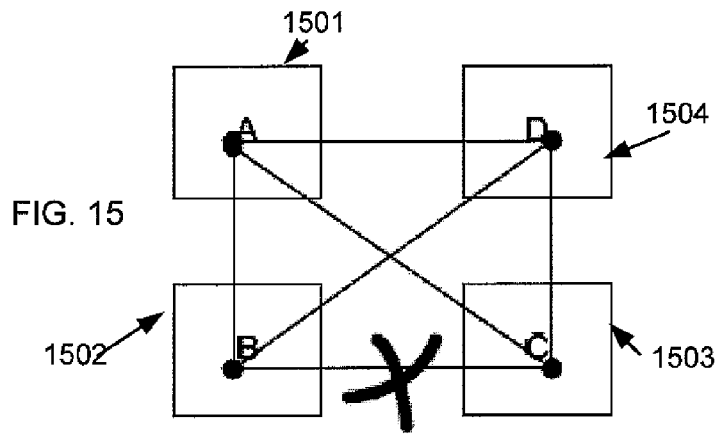

A network failure between two servers in a fully interconnected deployment does not partition the routing graph. The impact on routing is limited to the two affected servers. FIG. 15 shows the error scenario. A message published on server A 1501 will reach all other servers 1502, 1503, 1504. A message published on server B 1502 (or C 1503) will reach all other servers except server C 1503 (or B 1502, respectively). As a result, this routing topology is resilient to failures.

Figure 16B:
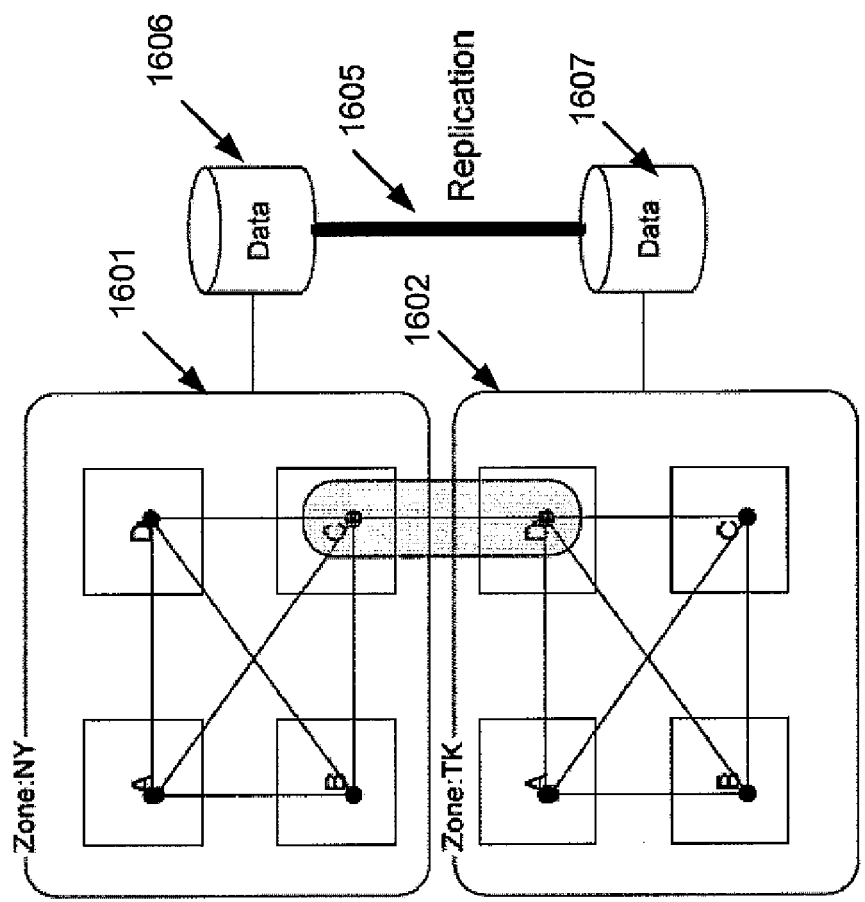
FIGS. 16A-B illustrate multiple hop and replication among multiple interconnected servers of the system.
Figure 16A:
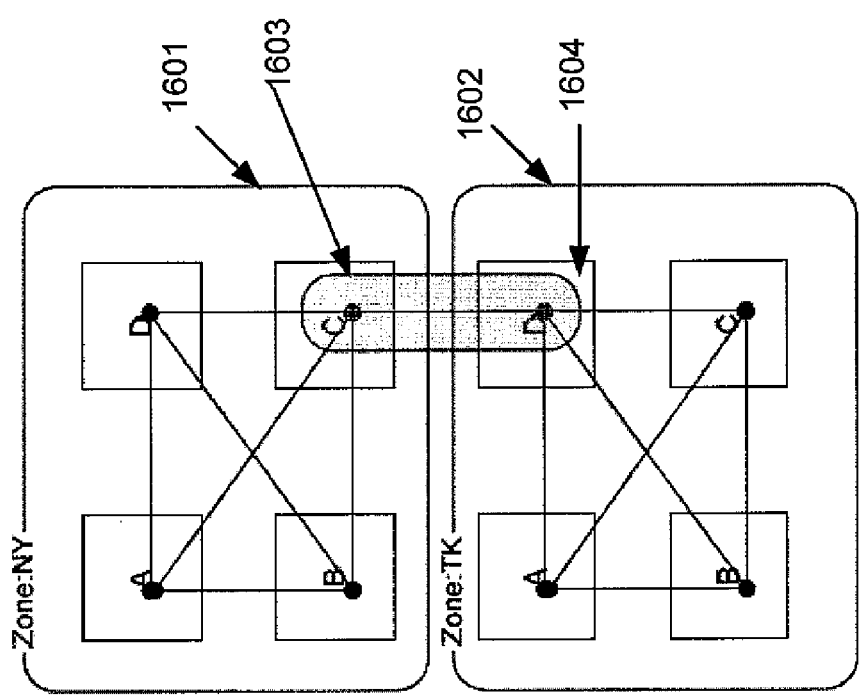

As explained above, with a zone (region), a fully-interconnected deployment provides optimal performance and resiliency to network failures. Two or more zones can be connected via a single 1-hop route as shown in FIGS. 16A-B. As shown in FIG. 16A, the fully-interconnected NY 1601 and TK 1602 zones are connected via a 1-hop route between Emissary C 1603 (in NY 1601 zone) and Emissary D 1604 (in TK 1602 zone). FIG. 16B illustrates multiple hop and replication 1605 among multiple interconnected servers of the system. Replication 1605 across databases 1606, 1607 of the zones 1601, 1602 may allow for data to be synchronized and/or shared across the zones.

Selectors

In addition to the ability to route message traffic between EMS servers, it is possible to set up selectors on routes. A selector allows only a subset of published messages to be routed. The use of selectors reduces network traffic and ensures that only relevant messages are forwarded. Selectors can be pre-configured or installed on demand.

System Monitoring

In some implementations, the JAVA Management Extension (JMX) technology is used to monitor and manage the Emissary. SpringFramework supports exposing a management API. Every bean that is managed and configured via SpringFramework can be automatically exposed as a managed bean.

Heartbeats

Heartbeats are typically used to detect the presence (or absence) of client processes. The ability to detect when a client process is no longer active can help in session management. Heartbeats allow servers to detect abnormal client termination.

Duplicate Session Detection

Connections to the EMS server have a (optional) ClientID attribute. Each ClientID is guaranteed to be unique within an EMS server. An attempt to open a connection with an existing ClientID throws an exception.

Enterprise Information Tier

The system includes persistence technology that can work both inside and outside of EJB containers, using JTA (JAVA Transaction API) transactions if inside and JDBC (JAVA DATABASE CONNECTIVITY) transactions if outside. Critical data entities in the system—such as trades and axes—are persisted in a relational database, in which application objects are mapped to the relational database. The following design patterns can be used: Domain Model, Identify, Data Mapper and Optimistic Offline Locking.

Domain Model

The domain model is an object model of the domain that will incorporate both behavior and data. Every business entity—e.g. TraderAxe, Inquiry, etc.—is modeled as a business object. A business object encapsulates both data and behavior. The Domain Model facilitates development because developers will be working with business objects rather than database artifacts.

Identity

At any given moment in time a business object will either be transient or persistent. A transient business object is an object that has been created in memory but has not yet been persisted. Once a business object is persisted, its identity must be unique within its class hierarchy—no two persisted business objects within a class hierarchy may have the same identify. Business object identity is represented by unique keys. This unique key is automatically generated by the persistent store. In preferred implementations, each persistent business object has a JAVA long field (Decimal in C#) that will uniquely identify the instance. This field—called ID—is generated automatically, using the available database capabilities, when the object is persisted.

Optimistic Offline Locking

Business objects are typically shared amongst clients. For example, two traders could be viewing the same business object. This sharing of business object is not solely for viewing purposes. Multiple users could simultaneously modify the same business object. Such changes are detected by the system when they occur, and clients whose updates have failed are notified.

Version

Each persisted business object has a JAVA long field (Decimal in C#) associated with it. This version is used to implement optimistic offline locking. For example, suppose two clients attempt to simultaneously modify a business object with the same ID and Version. Only one update succeeds in the database, and the client that submitted the failed update is notified of the failure.

Data Mapper

At some point in their lifecycle, objects from the Domain Model have to be persisted into a database. The Data Mapper layer moves data between objects from the Domain Model and a database while keeping them independent of each other.

In addition to the built-in lifecycle management of cached objects, the persistence interface allows the system to explicitly evict cached objects from memory. This feature is important for situations where the persistent store is modified by an external process. For example, if Position business objects are cached in the Emissary and an end-of-day (HOD) process modifies Position business objects in the database directly, the cached objects are no longer consistent with the database. In such scenarios it is important for the Emissary to be able to easily evict objects from its cache. In this example, the FOD process would notify the Emissary that it has updated all Position objects—in response, the Emissary could simply evict all Position business objects from its cache. Accordingly, the next time a Position is requested by the Emissary, a cache-miss will cause it to be loaded from the database.

Second, when the client sends a request that requires access to reference data, the client request contain only the identity of the reference object. Since an object reference simply translates to a foreign key in a relational database, the unique ID of the reference object is sufficient to create the necessary database mappings correctly.

Entitlements

Entitlements are primarily enforced by the Middle Tier. All reference data delivered to the client are based on entitlements. In addition, the Middle Tier is responsible for checking entitlements for key workflows, and for filtering out subsets of data content based on entitlements. Clients will typically have an existing entitlement service. As described elsewhere in this document, integration with external services is easily accomplished using the service oriented architecture of the system.

While clients may require their own entitlement infrastructure to be leveraged, where this is not so, a flexible entitlement framework is provided by the system. This entitlement framework consists of the entitled data types, actions, roles, users, groups (of users), etc. The framework is flexible enough to accommodate varied client requirements.

Data Driven Entitlements

The system entitlement framework defines a flexible data model. This data model allows client specific entitlements to be implemented by creating appropriate entries in the database. Below describes the key abstractions of the flexible data model provided by an entitlement framework of the system.

Datatype

An entitled data type is any business object that can participate in the entitlement model. It may be important to identify business objects for which users will be granted entitlements. For example, a typical trading system might entitle users to trading books, accounts (counterparty), sectors, etc.

Attribute

Entitled attributes may be defined for each entitled data type. Each attribute may have a name, a type, and a list of permitted values. It might not be necessary to define entitled attributes for every property of an entitled data type. For example, a trading book might contain many properties out of which only a handful participate in entitlements. Only those properties that participate in the entitlement model have to be defined. Entitled attributes can be defined as either required or optional. Required attributes must be provided by the entitled data type to the entitlement engine at run time.

Action

An entitled action is an operation that can be performed on an entitled data type. For example, a typical trading system will support entitled (CRUD) actions such as create, read (view), update and delete.

Type

The system supports both positive and negative entitlements. A positive entitlement asserts that the entitled attribute must have (contains) the specified value. In contrast, a negative asserts that the entitled attribute must not have (contains) the specified value.

Role

The system entitlement model allows roles to be defined. A role is the most general grouping of entitlements. For example, a typical trading system might have roles such as trader, salesperson, administrator, etc. Each role can be assigned its own set of entitlements.

Group

The next level for grouping of entitlements is entitled groups. An entitled group is a collection of entitled users. An entitled group can have a parent entitled group. In addition to its own set of entitlements, each entitled group inherits its parent's entitlements. Finally, roles can be assigned to an entitled group. As expected, each entitled group will inherit the entitlements of its role(s).

User

The final level of grouping of entitlements is entitled users. Each entitled user in the system can be granted fine grained entitlements. Each entitled user inherits the entitlements granted to any entitled group of which the user is a member.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in a computer-readable medium, e.g., in a machine-readable storage device, for execution by, or to control the operation of, data processing apparatus, e.g., a programmable processor, a computer, or multiple computers.

A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following s. For example, operations can differ and still achieve desirable results. In certain implementations, multitasking and parallel processing may be preferable. Other embodiments are within the scope of the following claims.

What is claimed:

1. A computer-implemented method comprising:
receiving data characterizing an indication of consummation of a trade of a bond from an emissary of a server application;
determining an interest of a customer to perform a second trade of a second bond related to the bond and based at least in part on the indication of the consummation and portfolio positions of the customer;
generating a notification to a client application of a client tier, wherein the notification is indicative of the interest;
receiving a request to generate an axe indicating a desire of the customer to buy or sell the second bond according to a set of criteria;
receiving data characterizing a request to publish the axe from the emissary; and
sending data characterizing an axe match, the axe match representing the intersection of the customer's axe with another customer's holdings or expressed interest.

2. The method of claim 1 further comprising a server causing the axe to be published.

3. The method of claim 1 further comprising prioritizing the axe at a level lower than an order to consummate a trade.

4. The method of claim 1 further comprising receiving from another client application data characterizing an inquiry for a bond matching the criteria and generating the axe match in response to the inquiry.

5. A computer program product, tangibly embodied on a computer-readable medium, the product comprising instructions to cause a data processing apparatus to perform operations comprising:

receiving data characterizing an indication of consummation of a trade of a bond from an emissary of a server application;

determining an interest of a customer to perform a second trade of a second bond related to the bond and based at least in part on the indication of the consummation of the trade and portfolio positions of the customer;

generating a notification to a client application of a client tier, wherein the notification is indicative of the interest;

receiving a request to generate an axe indicating a desire of the customer to buy or sell the second bond according to a set of criteria;

receiving data characterizing a request to publish the axe from the emissary; and sending data characterizing an axe match, the axe match representing the intersection of the customer's axe with another customer's holdings or expressed interest.

6. The product of claim 5, wherein the operations further comprise a server causing the axe to be published.

7. The product of claim 5, wherein the operations further comprise prioritizing the axe at a level lower than an order to consummate a trade.

8. The product of claim 5, wherein the operations further comprise receiving from another client application data characterizing an inquiry for a bond matching the criteria and generating the match in response to the inquiry.

9. The method of claim 2, wherein the axe is published as a tiered offering, wherein the axe varies in price based upon the entity to which the axe is published.

10. The method of claim 1, wherein the notification indicates the interest of the customer in performing multiple trades.

11. The method of claim 1, wherein the set of criteria does not include price.

12. A computer-implemented method comprising:

receiving data indicating a consummation of a trade of a first bond;

processing the data utilizing a processor, wherein the processing is with respect to historical data associated with a customer to identify trading ideas for the customer, wherein the historical data comprises positions of the customer;

presenting the trading ideas to a user;

identifying a suggested trading idea selected from the trading ideas relevant to the customer, where the step of identifying is the intersection of a set of criteria with historical data;

generating an axe in response to an indication of a desire of the customer to buy or sell a second bond according to the set of criteria; and performing an axe match between the axe and another customer's holdings or expressed interest.

13. The computer-implemented method of claim 12, the historical data comprising trade history of the customer and inquiries of the customer.

14. The computer-implemented method of claim 13, the historical data further comprising market history and market events.

15. The computer-implemented method of claim 12, wherein generating the axe includes offering the axe at multiple prices.

16. The computer-implemented method of claim 12, where the historical data comprises the data indicating consummation of the trade of the first bond.

17. The computer-implemented method of claim 12, further comprising:

matching an inquiry expressing an indication of interest to buy or sell a bond against the axe.

* * * * *